US009686075B2

(12) United States Patent
Gomez et al.

(10) Patent No.: US 9,686,075 B2
(45) Date of Patent: *Jun. 20, 2017

(54) KEY SHARING NETWORK DEVICE AND CONFIGURATION THEREOF

(71) Applicant: KONINKLIJKE PHILIPS N.V., Eindhoven (NL)

(72) Inventors: Domingo Gomez, Los Corrales (ES); Oscar Garcia Morchon, Eindhoven (NL); Ludovicus Marinus Gerardus Maria Tolhuizen, Waalre (NL); Jaime Gutierrez, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/654,687

(22) PCT Filed: Dec. 20, 2013

(86) PCT No.: PCT/EP2013/077842
§ 371 (c)(1),
(2) Date: Jun. 22, 2015

(87) PCT Pub. No.: WO2014/096420
PCT Pub. Date: Jun. 26, 2014

(65) Prior Publication Data
US 2015/0341172 A1 Nov. 26, 2015

Related U.S. Application Data

(60) Provisional application No. 61/740,488, filed on Dec. 21, 2012.

(30) Foreign Application Priority Data

Dec. 21, 2012 (EP) .................... 12198794

(51) Int. Cl.
H04L 9/30 (2006.01)
H04L 9/08 (2006.01)
H04L 29/06 (2006.01)

(52) U.S. Cl.
CPC .......... *H04L 9/3093* (2013.01); *H04L 9/0819* (2013.01); *H04L 9/0838* (2013.01);
(Continued)

(58) Field of Classification Search
CPC ... H04L 9/3093; H04L 9/0819; H04L 63/061; H04L 2209/24
See application file for complete search history.

(56) References Cited

U.S. PATENT DOCUMENTS

2009/0129599 A1* 5/2009 Garcia .................... H04L 9/083
380/279
2011/0317838 A1 12/2011 Garcia Morchon

FOREIGN PATENT DOCUMENTS

WO WO9595712 A2 2/1995
WO WO2007149850 A2 12/2007
(Continued)

OTHER PUBLICATIONS

Song Guo, "A permutation-based multi-polynomial scheme for pairwise key establishment in sensor networks", 2010, pp. 1-5.*
(Continued)

*Primary Examiner* — Brandon Hoffman
*Assistant Examiner* — Wasika Nipa
(74) *Attorney, Agent, or Firm* — Larry Liberchuk

(57) ABSTRACT

A method of configuring a network device for key sharing, the method comprising obtaining (410) in electronic form at least two parameter sets, a parameter set comprising a private modulus ($p_1$) a public modulus (N), and a bivariate polynomial ($f_1$) having integer coefficients, the binary representation of the public modulus and the binary representation of the private modulus are the same in at least key length (b) consecutive bits, generating local key material for
(Continued)

the network device comprising obtaining (420) in electronic form an identity number (A) for the network device, and for each parameter set of the at least two parameter sets obtaining a corresponding univariate polynomial, by determining, using a polynomial manipulation device, a univariate polynomial from the bivariate polynomial of the parameter set by substituting (430) the identity number into said bivariate polynomial, and reducing the result of the substitution modulo the private modulus of the parameter set, and electronically storing (450) at the network device the generated local key material, the generated local key material comprising the public modulus of each parameter set and the corresponding univariate polynomial of each parameter set.

17 Claims, 6 Drawing Sheets

(52) U.S. Cl.
CPC .......... *H04L 9/0866* (2013.01); *H04L 63/061* (2013.01); *H04L 2209/24* (2013.01)

(56) References Cited

FOREIGN PATENT DOCUMENTS

| WO | WO2010032161 A1 | 3/2010 |
|---|---|---|
| WO | WO2010106496 A1 | 9/2010 |
| WO | WO2013174554 A1 | 11/2013 |

OTHER PUBLICATIONS

Garcia Morchon, O. et al."Toward Full Collusion Resistant ID Based Establishment of Pairwise Keys", Book of extended abstracts of 3rd Int. Conf. On Symbolic Computation and Cryptography and 3rd Workshop on Mathematical Cryptography, Castro Urdiales, Spain, Jul. 9-13, 2012, pp. 30-35.

Song Guo et al., "A Permutation-Based 1,12, Multi-Polynomial Scheme for Pairwise Key 15-17 Establishment in Sensor Networks", Communications (ICC), 2010 IEEE International Conference On, IEEE, Piscataway, NJ, USA, May 23, 2010 (May 23, 2010), pp. 1-5, XP031703040.

Chanjun Yang et al, "Pairwise Key Establishment for Large-scale Sensor Networks: from Identifier-based to Location-based", ACM, 2 Penn Plaza, Suite 701—New York USA, May 29, 2006 (May 29, 2006)-Jun. 1, 2006 (Jun. 1, 2006), XP040043920.

Blundo C. et al., "Perfectly-Secure Key distribution for Dynamic Conferences", Springer Lecture Notes in Mathematics, vol. 740, pp. 471-486, 1993.

* cited by examiner

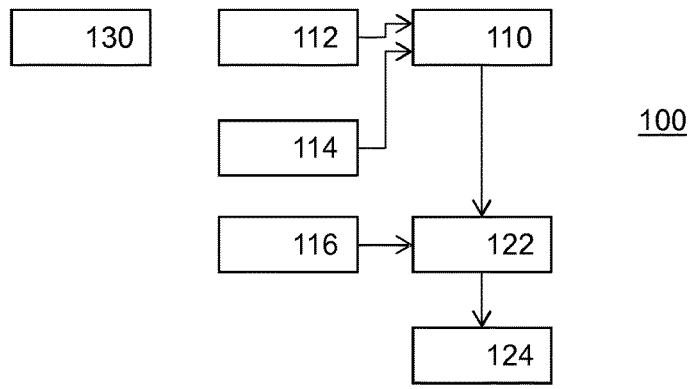
Figure 1
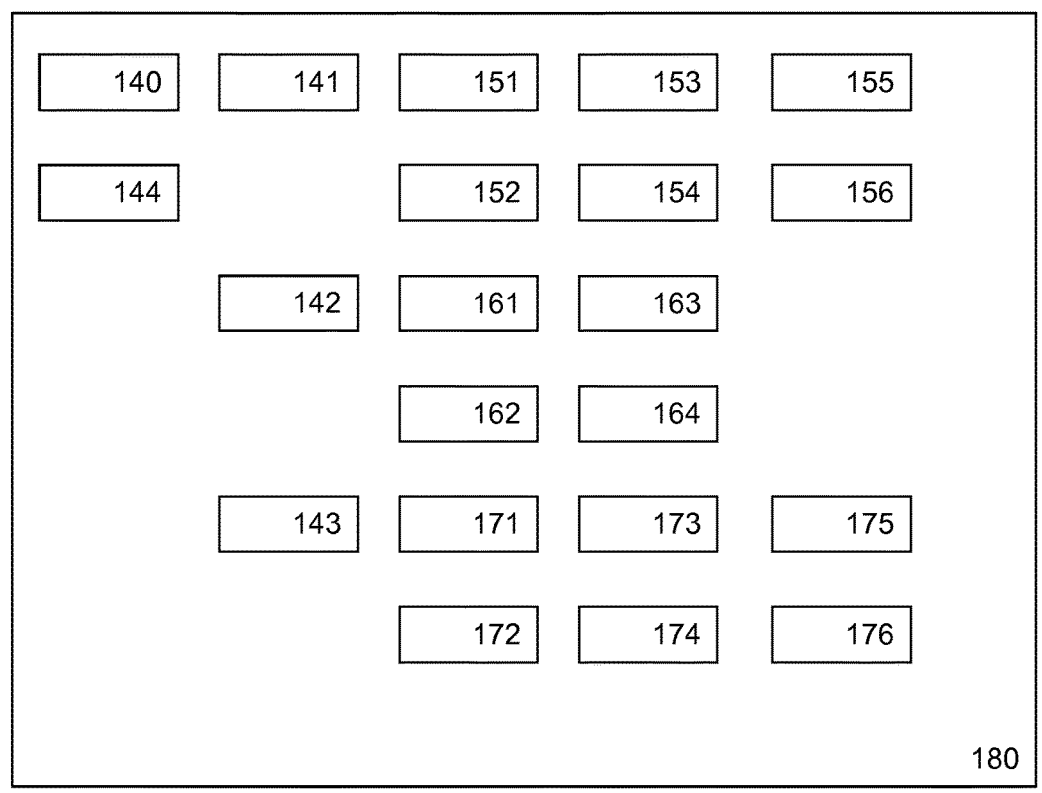
Figure 1´

KEY SHARING NETWORK DEVICE AND CONFIGURATION THEREOF

FIELD OF THE INVENTION

The invention relates to a method of configuring a network device for key sharing, the method comprising generating local key material for the network device comprising obtaining in electronic form an identity number for the network device, determining using a polynomial manipulation device a univariate polynomial from a bivariate polynomial by substituting the identity number into the bivariate polynomial, and electronically storing the generated local key material at the network device.

The invention further relates to a method for a first network device to determine a shared key, the key being a cryptographic key, the method comprising, obtaining local key material for the first network device in electronic form, the local key material comprising a univariate polynomial, obtaining an identity number for a second network device, the second network device being different from the first network device, substituting the identity number of the second network device into the univariate polynomial and deriving the shared key therefrom.

The invention further relates to a system for configuring a network device for key sharing, and to a network device configured to determine a shared key.

BACKGROUND OF THE INVENTION

The article by SONG GUO ET AL: "A Permutation-Based Multi-Polynomial Scheme for Pairwise Key Establishment in Sensor Networks", COMMUNICATIONS (ICC), 2010 IEEE INTERNATIONAL CONFERENCE ON, IEEE, PISCATAWAY, N.J., USA, 23 May 2010 (2010-05-23), pages 1-5, discloses a prior art solution.

Given a communications network comprising multiple network devices, it is a problem to set up secure connections between pairs of such network devices. One way to achieve this is described in C. Blundo, A. De Santis, A. Herzberg, S. Kutten, U. Vaccaro and M. Yung, "Perfectly-Secure Key distribution for Dynamic Conferences", Springer Lecture Notes in Mathematics, Vol. 740, pp. 471-486, 1993 (referred to as 'Blundo').

It assumes a central authority, also referred to as the network authority or as the Trusted Third Party (TTP), that generates a symmetric bivariate polynomial f(x,y), with coefficients in the finite field F with p elements, wherein p is a prime number or a power of a prime number. Each device has an identity number in F and is provided with local key material by the TTP. For a device with identifier $\eta$, the local key material are the coefficients of the polynomial f($\eta$,y).

If a device 11 wishes to communicate with device $\eta'$, it uses its key material to generate the key K($\eta$, $\eta'$)=f($\eta$, $\eta'$). As f is symmetric, the same key is generated.

A problem of this key sharing scheme occurs if an attacker knows the key material of t+1 or more devices, wherein t is the degree of the bivariate polynomial. The attacker can then reconstruct the polynomial f(x,y). At that moment the security of the system is completely broken. Given the identity numbers of any two devices, the attacker can reconstruct the key shared between this pair of devices.

SUMMARY OF THE INVENTION

It would be advantageous to have an improved method for establishing a shared key between two network devices. The invention is defined by the independent claims; the dependent claims define advantageous embodiments. A method of configuring a network device for key sharing, and a method for a network device to determine a shared key are provided.

The method of configuring a network device for key sharing comprises obtaining in electronic form at least two parameter sets, a parameter set comprising a private modulus, a public modulus, and a bivariate polynomial having integer coefficients, the binary representation of the public modulus and the binary representation of the private modulus are the same in at least key length consecutive bits, generating local key material for the network device comprising obtaining in electronic form an identity number for the network device, and for each parameter set of the at least two parameter sets obtaining a corresponding univariate polynomial, by: determining using a polynomial manipulation device a univariate polynomial from the bivariate polynomial of the parameter set by substituting the identity number into said bivariate polynomial, and reducing the result of the substitution modulo the private modulus of the parameter set, and electronically storing at the network device the generated local key material, the generated local key material comprising the public modulus of each parameter set and the corresponding univariate polynomial of each parameter set.

The method for a first network device to determine a shared key, the key being a cryptographic key, comprises obtaining local key material for the first network device in electronic form, the local key material comprising at least two, optionally obfuscated, univariate polynomials and corresponding public moduli, obtaining an identity number for a second network device, the second network device being different from the first network device, for each one of the at least two optionally obfuscated, univariate polynomials: substituting the identity number of the second network device into said univariate polynomial, and reducing the result of the substituting modulo the public modulus corresponding to said univariate polynomial, and adding the results of the reductions modulo a public modulus together and reducing modulo a key modulus, and deriving the shared key from the result of the reduction modulo the key modulus.

In an embodiment, the method comprises reducing the result of the substituting modulo the public modulus dividing the result by a power of two, and reducing modulo a key modulus.

Any pair of two network devices out of multiple devices that each have an identity number and local key material generated for the identity number are able to negotiate a shared key with few resources. The two network devices need only exchange their identity numbers, which need not be kept secret, and perform polynomial computations. The type of computations needed do not require large computational resources, which means that this method is suitable for low-cost high volume type of applications.

The local key material has been obtained from a common polynomial in the root key material; this allows both network devices in a pair of network devices to obtain the same shared key. If all bivariate polynomials are symmetric than any two network devices may derive a common polynomial. If some or all of the bivariate polynomials are asymmetric some pair of devices can, and some pairs cannot derive a shared key.

The local key material is derived from parameter set, in particular from multiple different public moduli and multiple bivariate polynomials. The resulting local key material comprises multiple, typically different, univariate polynomials each with a corresponding public modulus.

If only one parameter set was used, then the network device is provided with the coefficients of a polynomial so that by evaluating it modulo N and taking b bits it is able to generate a b-bit key with any other device. This is related to the so-called noisy polynomial interpolation problem, i.e., by having many of those b-bit keys, an attacker might be able to recover the polynomial of a given entity under attack.

For example, an attack facing a single parameter set system could get those b-bit values by following 2 steps: the attacker compromises N_c devices associated to N_c keying materials, and the attacker uses those N_c keying materials to obtain N_c b-bit keys (by evaluating each of the keying materials in the identifier of the device under attack). This means that progress made on the noisy polynomial interpolation problem may extend to attacks on the single parameter set system. This is considered undesirable.

Having multiple parameter sets avoids this problem by mixing modular operations on the device as well as during local key generation.

The shared common key $K_{AB}$ between a pair of devices A and B is obtained as the addition of at least two (in general, m') sub-keys $K_{AB}^i$, i.e. $K_{AB}=K_{AB}^1+K_{AB}^2$. Each subkey $K_{AB}^i$, is generated from a different keying material in which the modular operations are performed modulo the public modulus $N_i$. Since modular operations are mixed during local key generation as well as during shared key generation it is not possible to extend noisy polynomial interpolation attacks to the cryptosystem. Even if an attacker gains access to N_c b-bit keys, each one of them is derived from two subkeys, each subkey coming from the evaluation of a different keying material. But the attacker will not be able to differentiate the subkeys so that the attacker cannot recover the two (m' in general) keying materials of the device under attack.

There are two levels of seriousness of attacks on devices. In lower seriousness the attacker only gains access to many common shared keys. In higher seriousness the attacker gains access to many local key materials. It turns out that having mixing modular operations at the network device is a good countermeasure against the attack of lower seriousness. However, if the attacker has access to the key material itself then he also has access to the subkeys.

The latter problem is avoided by adding noise to the two keying materials of a device. Adding an obfuscating number to the local key material disturbs the relation between the local key material and the root key material. The relation that would be present between the unobfuscated univariate polynomial and the (symmetric) bivariate polynomials is no longer present. This means that the straightforward attack on such a scheme no longer works.

Interestingly, by adding noise to the two keying materials of a device such that the addition of the noise equals zero modulo $2^b$ further improves the system. In this case: the generated keys are still noisy, and thus, an attacker cannot use them to recover the keying material shares of a device under attack; Yet to remove the noise, the attacker has to add them, but then it he has the added value as above and cannot differentiate between the components originated from each of the keying materials. This technique can be easily generalized to any number of keying materials. The condition can also be extended to make sure that the noise equals zero in b bits located not in the least significant bits but somewhere else.

In an embodiment, the binary representation of all public modulus and the binary representation of the private modulus in each parameter set are the same in at least key length (b) consecutive bits. Note, multiple private moduli may be used; they may be chosen such that the binary representation of any one of the multiple private moduli of the public modulus and the binary representation of the private modulus are the same in at least key length (b) consecutive bits. For each private modulus of the multiple private moduli a, optionally symmetric, bivariate polynomial having integer coefficients is chosen to obtain multiple, and optionally symmetric, bivariate polynomials.

Because the derivation of the local key material uses a private modulus which is different from the public modulus, the mathematical relationship that would be present when working, say, in a single finite field is disturbed. This means that the usual mathematical tools for analyzing polynomials, e.g. finite algebra, no longer apply. At best an attacker may use much less efficient structures, such as lattices. Also when deriving the shared key two modulo operations are combined which are not compatible in the usual mathematical sense; so mathematical structure is avoided at two places. The method allows direct pair wise-key generation and is resilient to the capture of a very high number, e.g. in the order of 10^5 or even higher, of network devices. On the other hand because the private and the public modulus overlap in a number of consecutive bits, two network devices that have local key material are likely to be able to derive the same shared key.

A particular insight of the inventors was that the public modulus need not be a prime number. In an embodiment, the public modulus is composite. Also there is no reason why the public modulus should be an 'all-one' bits number, e.g. a number which only consists of '1' bits, in its binary representation. In an embodiment the public modulus is not a power of two minus 1. In an embodiment, the binary representation of the public modulus comprises at least one zero bit (not counting leading zero's, i.e., the binary representation of the public modulus comprises at least one zero bit less significant than the most significant bit of the public modulus). In an embodiment, the public modulus is a power of two minus 1 and composite.

In an embodiment the public modulus of one or more parameter sets is larger than the one or more private moduli.

In an embodiment, at least key length consecutive bits of the binary representation of the public modulus minus the private modulus are all zero bits. This difference should be evaluated using the signed number representation of the public modulus minus the private modulus, not the two-complement representation. Alternatively, one may require that at least key length consecutive bits of the binary representation of the absolute value of the public modulus minus the private modulus are all zero bits. There is a set of key length (b) consecutive positions in which the binary representation of the public modulus agrees with the binary representation of all private moduli.

The consecutive bit positions in which the public modulus agrees with the private moduli, may be the least significant bits. In an embodiment, the least significant key length bits of the binary representation of the public modulus minus the private modulus are all zero bits; this has the advantage that a division by a power of two is not needed when deriving the shared key.

In an embodiment, in all parameters sets, the same at least key length (b) consecutive bits of the binary representation of the public modulus of a respective parameter set are the same as the least significant key length (b) bits of the private modulus the respective parameter set. That is, there is a set of consecutive bit positions that indicate in each parameter set where the public and private moduli agree. Although this set of consecutive bit positions is the same for all parameter sets, the bits themselves may be different across different parameter sets. In an embodiment, the at least key length (b) consecutive bits are the least significant key length (b) bits. That is, the set of bit positions are the least significant bit positions.

It is allowed that one private modulus of the multiple private moduli is equal to the public modulus. However if only one private modulus is used then this is undesirable.

It is desirable that the private moduli introduce sufficient non-linearity. In an embodiment, there is a set of consecutive bit positions in which the public modulus differs with each private moduli. Furthermore, it may also be imposed that the private moduli differ among themselves; a pair wise comparison of the binary representation of the private modulus may also differ in at least one bit in a set of, say at least key length, consecutive bits, the set being equal for all private modulus, and possibly also the same for the public modulus.

The network device may be an electronic device equipped with electronic communication and computation means. The network device may be attached, e.g. in the form of an RFID tag, to any non-electronic object. For example, this method would be suitable for the 'internet of things'. For example, objects, in particular low cost objects, may be equipped with radio tags through which they may communicate, e.g. may be identified. Such objects may be inventoried through electronic means such as a computer. Stolen or broken items would be easily tracked and located. One particularly promising application is a lamp comprising a network device configured to determine a shared key. Such a lamp may securely communicate its status; such a lamp could be securely controlled, e.g. turned on and/or off. A network device may be one of multiple network devices each comprising an electronic communicator for sending and receiving an identity number and for sending an electronic status message, and each comprising an integrated circuit configured for deriving a shared key following a method according to the invention.

In an embodiment, the method in the invention can be used as a cryptographic method for security protocols such as IPSec, (D)TLS, HIP, or ZigBee. In particular, a device using one of those protocols is associated to an identifier. A second device willing to communicate with the first device can generate a common pairwise key with the first device given its identifier, and the pairwise key (or a key derived from this by means of, e.g. a key derivation function) can be used in a method of the above protocols based on pre-shared key. In particular, the identifier of a device as defined in this invention can be a network address such as the ZigBee short address, an IP address, or the host identifier. The identifier can also be the IEEE address of a device or a proprietary bit string associated to the device so that a device receives some local keying material associated to the IEEE address during manufacturing.

Deriving a shared key may be used for many applications. Typically, the shared key will be a cryptographic symmetric key. The symmetric key may be used for confidentiality, e.g. outgoing or incoming messages may be encrypted with the symmetric key. Only a device with access to both identity numbers and one of the two local key materials (or access to the root key material) will be able to decrypt the communications. The symmetric key may be used for authentication, e.g. outgoing or incoming messages may be authenticated with the symmetric key. In this way the origin of the message may be validated. Only a device with access to both identity numbers and one of the two local key materials (or access to the root key material) will be able to create authenticated messages.

The method of configuring a network device for key sharing will typically be executed by a network authority, e.g. a trusted third party. The network authority may obtain the needed material, e.g. root key material from another source, but may also generate this himself. For example, the public modulus may be generated. For example, the private modulus may be generated, even if the public modulus is a system parameter and received.

In an embodiment, one or more or all of the public moduli N are chosen such that it satisfies $2^{(a+2)b-1} \leq N \leq 2^{(a+2)b}-1$, wherein, a represents the degree of the bivariate polynomial and b represents the key length. For example, in an embodiment $N=2^{(a+2)b}-1$. The modulo operation for the latter choice may be implemented particularly efficiently.

Having fixed public moduli has the advantage that it need not be communicated to the network devices, but may be integrated with e.g. their system software. In particular, the public modulus may be chosen using a random number generator.

Public and private moduli may be represented as a bit string. They may also be abbreviated using each particular mathematical structure. For example, instead of storing a private modulus, one may also store its difference with the public modulus, which is much shorter.

Having a private modulus chosen in such a way that a 'key length' number of the least significant bits of the binary representation of the public modulus minus the private modulus are all zero bits increases the likelihood that a shared key at a first network device of a pair of network device is close to the shared key derived at a second network device of the pair of network device; that is the binary representation of the private modulus has the same bits in the 'key length' least significant positions as the binary representation of the public modulus. For example, if the key length is 64, a private modulus may be chosen by subtracting a multiple of 2^64 from the public modulus. In an embodiment, the public modulus minus a private modulus divided by two to the power of the key length is less than two to the power of the key length.

In an embodiment multiple private moduli are obtained or generated in electronic form, for each private modulus of the multiple private moduli a symmetric bivariate polynomial having integer coefficients is chosen to obtain multiple symmetric bivariate polynomials, so that to each private modulus a symmetric bivariate polynomial corresponds. Determining the univariate polynomial comprises substituting the identity number into each one of the multiple symmetric bivariate polynomials, reducing modulo a private modulus of the multiple private moduli corresponding to the one symmetric bivariate polynomial, and adding the multiple results of the multiple reductions together. Having multiple symmetric bivariate polynomials for different moduli increases the security because incompatible structures are further mixed. Typically the private moduli are distinct. Having multiple private moduli further complicates analysis even more if the corresponding algebraic structures are very different; for example, choosing them relatively prime, in particular pair-wise relatively prime, even more in particular by choosing them as distinct primes.

Having a different private modulus, and in particular multiple private moduli, will complicate analysis by an attacker. To further increase security additional controls on the coefficients are possible. In an embodiment, the authority adding the multiple resulting univariate polynomials of the multiple reductions together verifies whether the value of each of the resulting coefficients is either too small or too big, e.g. less than a minimum threshold or above a maximum threshold. This improves security even further because in either of the two cases, an attacker might find out the components of the multiple reductions if they are too big or too small. For instance, if the value of a coefficient resulting after the addition is equal to 1 and there are only two univariate polynomials, then an attacker knows that either, the corresponding coefficient associated to the first polynomial is 1 and the one associated to the second polynomial is 0, or the other way around. In particular, the authority generating the local key material for a device can verify whether the value of each of the resulting coefficients of the local keying material is at least 'minimum value' and at most 'maximum value'. This checking may be omitted, in particular, if the public modulus is relatively close to all private moduli and all elements of the key material are between 0 and N−1. If the TTP is capable of assigning identity numbers it could also assign another identity number to the device, if the TTP detects small or big coefficients.

In an embodiment, each specific private modulus is such that the least significant key length (b) bits of the binary representation of the public modulus minus the specific private modulus are all zero bits.

The public modulus may both be larger or smaller than the private modulus. In an embodiment the binary representation of the public modulus minus the private modulus has at least key length bits all zero. The zero bits at least key length zero bits are consecutive and may be present at any point in the binary representation. Having a string of zero bits in the difference between the public modulus and the private modulus avoids that obfuscation carries too far. Note that the string may but does not need to be present over all parameter sets.

In an embodiment, there is an integer parameter 's', such that key length least significant bits of the public modulus minus the private modulus, divided by two to the power s are all zero. The parameter 's' is the same for all private moduli, but may be different per parameter set.

For example, one may define a zero bit string divisor which is a power of two, such that each specific private modulus being such that key length (b) bits of the binary representation of the public modulus minus the specific private modulus divided by the zero bit string divisor are all zero bits. If the least significant bits are zero, the zero bit string divisor may be taken to be 1. In an embodiment the zero bit string divisor is larger than 1. The division by a power of two is to be interpreted as an integer division, giving the same result as a shift of the bits in the direction of the least significant bits. Any remainder of the division is ignored.

To generate the shared key of key length bit, the network devices first apply an additional division step. The first network device evaluates the keying material for the identity number of the second device modulo the public modulus for each parameter sets and adds the results, then dividing by 2^s and reducing modulo two to the power of the key length. Note that this is equivalent to applying first a module 2^(s+key length) after the public modulo, and then dividing by 2^s. Here "dividing" includes rounding downwards.

In an embodiment, the private modulus is generated using a random number generator. In an embodiment, the multiple private moduli are generated such that they are pair wise relatively prime. For example, the multiple private moduli may be generated iteratively verifying for each new private modulus that they are still pair wise relatively prime, and if not discarding the last generated private modulus. An embodiment comprises iteratively generating a candidate modulus, using the random number generator, such that key length (b) consecutive bits of the binary representation of the public modulus minus the candidate modulus are all zero bits, e.g. the least significant key length bits, until the candidate modulus satisfies a primality test using a primality testing device, wherein the so obtained candidate modulus satisfying the primality test is used as the private modulus. The primality test may, e.g. be the Miller-Rabin primality test or the Solovay-Strassen primality test.

A symmetric bivariate polynomial in variables of x and y of degree a, has only monomials of the form $x^i y^j$, with $i \leq a, j \leq a$. Furthermore the coefficient corresponding to $x^i y^j$ is the same as the coefficient of $x^j y^i$. This may be used to reduce the number of stored coefficients by about half. Note that a more relaxed definition of the degree is used. We define the degree of a monomial, as the maximum degree of the variables in the monomial. So the degree of $x^j y^i$ is $\max(i,j)$, i.e., that $i \leq a, j \leq a$. So for example what we call a polynomial of degree 1 has as general form a+bx+cy+dxy, (note that since only symmetric polynomials are considered, we have that b=c). Note that if desired one may put additional restrictions on the bivariate polynomial, including, e.g. that only monomials with $i+j \leq a$ are used, but this is not needed.

In an embodiment the symmetric bivariate polynomial is generated by the network authority. For example, the symmetric bivariate polynomial may be a random symmetric bivariate polynomial. For example, the coefficients may be selected as random numbers using a random number generator.

Although the obfuscation used greatly increases the resilience against attack, in particular against collusion attacks wherein multiple local key materials are combined, it has a potential drawback. Sometimes the shared key derived by the first network device is not in all bits identical to the shared key derived by the second network device. This is mainly due to the mismatch in the bits of carry after the addition of the obfuscating coefficients. Another reason is the lacking effect of the modular effects of each of the private moduli during the generation of the key that affects the generated bits of carry. Although a nuisance this drawback may be resolved in various manners. By choosing the obfuscation with more care the likelihood of a difference and in particular the likelihood of a large difference can significantly be reduced. Furthermore, it was found that differences, if they are any, are likely to be located in the least significant bits of the generated keys. So by removing one or more of the least significant bits the likelihood of an identical shared key may be increased. For example, in an embodiment of the method of determining a shared key comprises determining if the first network device and the second network device have derived the same shared key, and if not deriving a further shared key from the result of the reduction modulo the key modulus. Further shared keys may be derived until one is found that is equal on both sides. If less than a threshold number of bits remain in the shared key, the method may be terminated. For some applications it may simply be accepted that some percentage of the network devices are not able to communicate. For example, in ad-hoc wireless networks wherein a message may be routed along various routes, there is no loss of connectivity if some of the network devices are not able to communicate.

In an embodiment, a number of the least significant bits of the shared key are removed; for example, the number of removed bits may be 1, 2 or more, 4 or more, 8 or more, 16 or more, 32 or more, 64 or more. By removing more of the least significant bits, the chance of having keys that are not equal is reduced; in particular it may be reduced to any desired threshold. The chance of shared keys being equal may be computed, by following the mathematical relationships, it may also be determined by experiment.

Also the choice of obfuscating numbers may be controlled, in an embodiment, the range from which an obfuscating number is chosen is reduced for coefficients corresponding to higher degree monomials. In particular, one may require that $|\epsilon_{A,i}|<2^{(a+1-i)b}$, wherein $\epsilon_{A,i}$ denotes the obfuscating number for the i-th monomial, i denotes the degree of the monomial corresponding to the coefficient, a represents the degree of the bivariate polynomial and b represents the key length. A represents the network device for which the local key material is generated. In an embodiment, an obfuscating number is generated for each coefficient, e.g. using the above formula. Different obfuscation may be applied for different network devices. For example, even if there are 3 or more network devices, than for each network device different obfuscation numbers may be generated.

Note that the obfuscating number may be restricted to positive numbers but this is not needed, the obfuscating numbers may be negative. In an embodiment, the obfuscated numbers are generated using a random number generator. Multiple obfuscating numbers may be generated and added coefficients of the univariate polynomial to obtain the obfuscated univariate polynomial. One or more, preferably even all, coefficients of the univariate polynomial may be obfuscated in this manner.

The number of bits in the identity number for the network device is usually chosen as less or equal than the key length. The identity number may be a bit string, say a 32 or 64, or longer, bits string. The key length may be 32 or more, 48 or more, 64 or more, 96 or more, 128 or more, 256 or more. The key length may be chosen some number of bits higher in order to reduce a corresponding number of least significant bits of the determined shared key. On the other hand, In an embodiment, the length of the identity number is longer than the key length. In this case, the effect of modular operations can lead to a higher effect on the least significant bits of the key length-bits of the generated key so that those bits might not be equal for a pair of devices willing to generate a common key. Having a longer length for the identifier can have, however, a positive effect in the security since more bits are mixed together when doing the corresponding computations.

A polynomial manipulation device may be implemented in software running on a computer, say on an integrated circuit. A polynomial manipulation device may be very efficiently implemented in hardware. A combination is also possible. For example, a polynomial manipulation device may be implemented by manipulating arrays of coefficients representing the polynomials.

Electronically storing the generated local key material at the network device may be implemented by electronically sending the generated local key material to the network device, e.g. using a wired connection, or using a wireless connection and having the generated local key material stored at the network device. This may be done during manufacturing or installation, e.g. during testing, of an integrated circuit in the network device. The test equipment may comprise or be connected the network authority. This may also happen after a successful joining of a device to an operation network (i.e., after network access or bootstrapping). In particular, the local key material can be distributed as a part of operational network parameters.

Obtaining local key material for the first network device in electronic form may be done by electronically receiving the local key material from a system for configuring a network device for key sharing, e.g. a network authority device. Obtaining local key material may also be done by retrieving the local key material from a local storage, e.g. a memory such as flash memory.

Obtaining an identity number for a second network device, may be done by receiving the identity number from the second network device, e.g. directly from second network device, e.g. wirelessly receiving from the second network device.

The public modulus and the key modulus may be stored in a network device. They may also be received from a network authority. They may also be implicit in software of the network device. For example, in an embodiment the key modulus is a power of two. Reduction modulo such a key modulus may be done by discarding all bits except the key length least significant bits. First the result of the substituting is reduced modulo the public modulus which is then further reduced modulo the key modulus.

Although not required, the public modulus and key modulus may be relatively prime. This may be achieved by having the public modulus odd and the key modulus a power of 2. In any case, it is avoided that the key modulus divides the public modulus, as then reduction modulo the public modulus could be omitted.

The method for key agreement between two devices may use as root keying material a number of bivariate polynomials. One may use the method for key agreement using for x-agreement between x parties by using x-variate polynomials as root keying material. In this extension, the trusted third party evaluates the x-variate polynomials in a variable in the corresponding ring, the resulting x−1 variate polynomials are then added over the integers generating the local key material stored on a device. When x devices need to agree on a key, a device evaluates its local key material in identifiers of the other x−1 devices.

The use of asymmetric bivariate polynomials as root keying material, i.e., f(x,y)!=f(y,x), allows to accommodate the creation of two groups of devices such as devices in the first group receive KM(Id,y) and devices in the second group receive KM(x,iD) being KM the local key material stored on a device. Two devices belonging to the same group cannot generate a common key, but two devices in different groups can. See further Blundo.

The identity number of a network device may be computed as the one-way function of a bit string containing information associated to the device. The one-way function can be a cryptographic hash function such as SHA2 or SHA3. The output of the one-way function can be truncated so that it fits the identifier size. Alternatively the size of the one-way function is smaller than the maximum identifier size.

In an embodiment, the symmetric polynomials involve a single monomial of the form $\langle ax^i y^i \rangle_p$ where $\langle \rangle_p$ represents the modular operation. In this case, the elements are within a finite group and the operation is the multiplication. The public modulus may be larger than the private modulus or smaller; if there are multiple private moduli, some maybe larger than the private modulus and some may be smaller.

The root key material, may be evaluated over any ring. It is possible to use polynomials of a single monomial such as $Ax^a$, in which case a group may be used.

An aspect of the invention concerns a system for configuring a network device for key sharing, e.g. a network authority, the system comprising a key material obtainer for obtaining in electronic form at least two parameter sets, a parameter set comprising a private modulus, a public modulus, and a bivariate polynomial having integer coefficients, the binary representation of the public modulus and the binary representation of the private modulus are the same in at least key length consecutive bits, a generator for generating local key material for the network device comprising a network device manager for obtaining in electronic form an identity number for the network device and for electronically storing the generated local key material at the network device, and a polynomial manipulation device, the generator being configured to, for each parameter set of the at least two parameter sets obtaining a corresponding univariate polynomial, by: determining using a polynomial manipulation device a univariate polynomial from the bivariate polynomial of the parameter set by substituting the identity number into said bivariate polynomial, and reducing the result of the substitution modulo the private modulus of the parameter set, and electronically storing at the network device the generated local key material, generated local key material comprising the public modulus of each parameter set and the corresponding univariate polynomial of each parameter set.

An embodiment of the system comprises an obfuscating number generator, e.g. a random number generator, for generating an obfuscating number, the polynomial manipulation device is configured for adding the obfuscating number to a coefficient of the univariate polynomial to obtain an obfuscated univariate polynomial, the generated local key material comprising the obfuscated univariate polynomial. The obfuscating number may be represented as the coefficient of an obfuscating polynomial. In an embodiment, each coefficient of the sum of the obfuscating polynomials is a multiple of 2 to the power of the key length. In an embodiment, each coefficient of the sum of the obfuscating polynomials divided by a power of two is a multiple of 2 to the power of the key length. The division by a power of two may be computed by rounding downwards.

An aspect of the invention concerns a first network device configured to determine a shared key, the key being a cryptographic key, the first network device comprising: a local key material obtainer for obtaining local key material for the first network device in electronic form, the local key material comprising at least two, optionally obfuscated, univariate polynomials and corresponding public moduli, a receiver for obtaining an identity number for a second network device, the second network device being different from the first network device, a polynomial manipulation device for, for each one of the at least two optionally obfuscated, univariate polynomials: substituting the identity number of the second network device into said univariate polynomial, and reducing the result of the substituting modulo the public modulus corresponding to said univariate polynomial, and adding the results of the reductions modulo a public modulus together and reducing modulo a key modulus, and a key derivation device for deriving the shared key from the result of the reduction modulo the key modulus.

A key derivation device may be implemented as a computer, e.g. an integrated circuit, running software, in hardware, in a combination of the two, and the like, configured for deriving the shared key from the result of the reduction modulo the key modulus.

Deriving the shared key from the result of the reduction modulo the key modulus, may include the application of a key derivation function, for example the function KDF, defined in the OMA DRM Specification of the Open Mobile Alliance (OMA-TS -DRM-DRM-V2_0_2-20080723-A, section 7.1.2 KDF) and similar functions. Deriving the shared key may include discarding one or more least significant bits (before applying the key derivation function). Deriving the shared key may include adding, subtracting, or concatenating an integer (before applying the key derivation function).

Multiple network devices each having an identity number and corresponding local key material may together form a communication network configured for secure, e.g. confidential and/or authenticated, communication between pairs of network devices.

The key generation is ID-based and allows the generation of pair wise keys between pairs of devices. A first device A may rely on an algorithm that derives a key from local key material and an identity number.

In an embodiment, a first network device sends a key confirmation message to the second network device. For example, a confirmation message may comprise the encryption of a message, and optionally the message itself. The second network device can verify the encryption of the message. The message may be fixed and present at the second device, to avoid the need of sending it. The message may be random, or a nonce, etc, in which case it may be sent together with the encryption. The second device may reply with a message with contains an indication if the keys agree. The second device may also reply with a key confirmation message of its own. It the first and/or second device finds out that the keys are not equal they may start a key equalization process, e.g. by deleting least significant bits, etc.

The network devices and the system may be electronic devices. The network devices may be mobile network devices.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings, FIG. 1 is a schematic block diagram illustrating a root key material generator.

Figure 2:
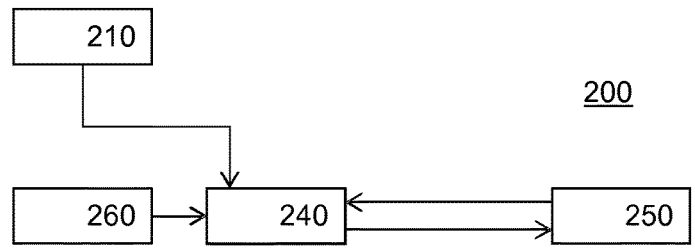
FIG. 2 is a schematic block diagram illustrating a local key material generator.
Figure 2:
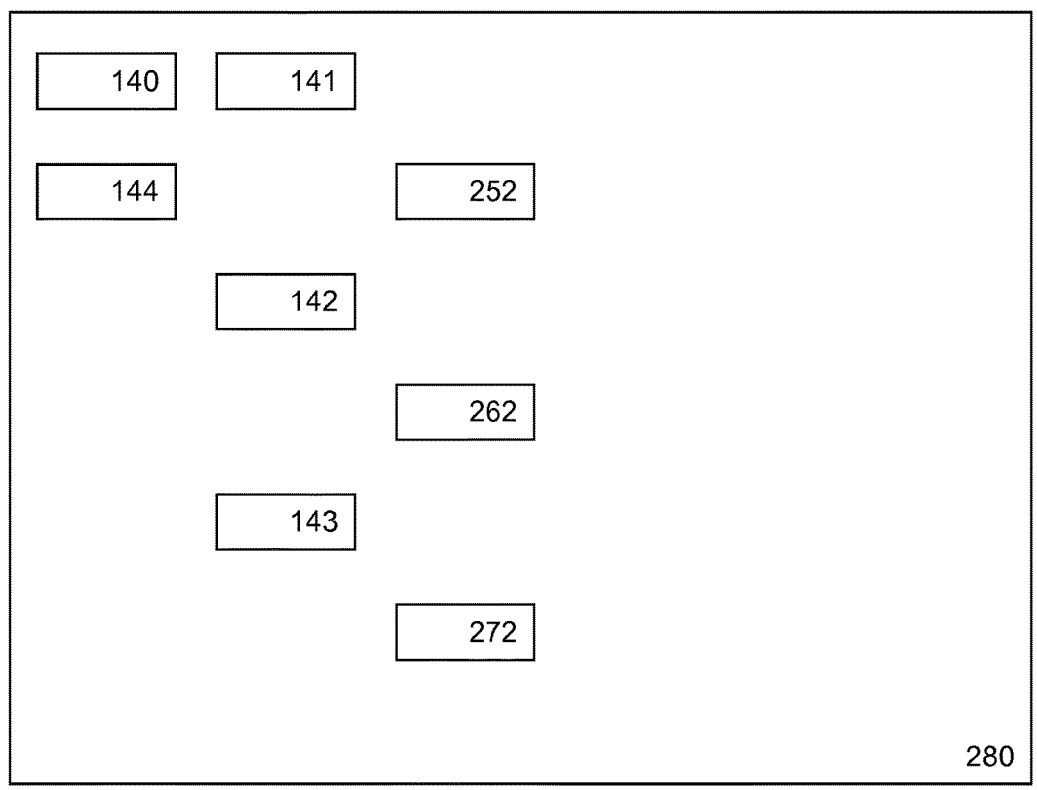

It should be noted that items which have the same reference numbers in different Figures, have the same structural features and the same functions, or are the same signals. Where the function and/or structure of such an item has been explained, there is no necessity for repeated explanation thereof in the detailed description.

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

Below an embodiment of the key sharing method is described. The method has a set-up phase and a use phase. The set-up phase may include initiation steps and registration steps. The initiation steps do not involve the network devices.

The initiation steps select system parameters. The initiation steps may be performed by the trusted third party (TTP). However, the system parameters may however also be regarded as given as inputs. In that case the trusted third party need not generate them, and the initiation steps may be skipped. For example, the trusted third party may receive the system parameters from a device manufacturer. The device manufacturer may have performed the initiation steps to obtain the system parameters. For convenience of exposition we will refer to the trusted third party as performing the initiation steps, bearing in mind that this is not necessary.

In the initiation steps a number of parameter sets are established. Given the identification number of a network device, the parameter sets are used to generate local key material; from each parameter set a univariate polynomials and a corresponding public modulus is obtained. The network device is given the local key material but is not given access to the parameter sets. Since the parameter sets allow one to generate new local key material, they are known only to trusted party, and are kept secret from general network devices.

A network device A can generate a shared key from his local key material and the identification number of a different device B. To do this network device A performs a computation using his local key material.

Initiation Steps

In the initiation steps the root key material is selected. A few parameters are global parameters.

The desired key length for the key that will be shared between devices in the use phase is selected; this key length is referred to as 'b'. A typical value for a low security application may be 64 or 80. A typical value for a consumer level security may be 128. Highly secret applications may prefer 256 or even higher values. There need not be a direct relationship between the security strength of the algorithm and b; the security provided will be at most b. Depending on future algorithms to attack the system, the security of the algorithm might be lower than b.

The number of parameter sets that will be generated is selected; the number of parameter sets is referred to as 't'. A high value of t implies that attacking the resulting system, e.g. using lattice based techniques, is harder. On the other hand a higher value of t also implies more computation and storage requirements at the network devices. For very low security applications a value of t=1 is possible, however it may imply that given a sufficient number of compromised keys the underlying key material may be recovered. It is recommended taking at least a value of t=2; this value already causes a significant increase in the complexity of the required cryptanalysis, e.g. lattice-based attacks. Nevertheless, for high security applications a value of 3, 4 or even higher may used.

Next a number of t parameter sets are selected. Each parameter set j, with j=1, . . . , t comprises a desired degree a, a public modulus N, at least one private modulus $p_1$, and at least one symmetric bivariate polynomials $f_1$. When convenient, the public modulus will be noted with a subscript to indicate the parameter set to which is belongs: $N_j$.

Advantageous ways to select these parameters are discussed below. Especially, the bivariate polynomials of each parameter set are security sensitive and will not be disclosed to the normal network devices; there is no reason to disclose the private moduli either, so it is recommended to keep these secret, knowledge of them may even ease an attack on the system. The key length b and public moduli $N_j$ are needed at the network device and cannot be kept secret to the trusted party.

Each parameter set contributes to the hardness of the underlying hard problem. As will be explained below some choices for parameters will cause a harder problem than other choices. In principle the parameter set selection is independent, for example, one may choose to select one parameter set with values corresponding to higher security and selecting a second set with smaller parameters. In this case the second and/or further sets contribute mainly to avoid attacks on the hard set. For this scenario it may be somewhat easier to derive bounds on the security. On the other hand, one may also select all parameter sets of comparable difficulty. In the latter situation, the difficulty of the problem comes from all sets. This optimizes computation resources at the network device.

Parameters Set Selection Steps

These steps will be repeated t times; once for each desired parameter set.

The desired degree is selected; the degree controls the degree of certain polynomials. The degree will be referred to as 'a', it is at least 1. A practical choice for a is 2. A more secure application may use a higher value of a, say 3 or 4, or even higher. For a simple application also a=1 is possible. The case a=1 is related to the so called 'hidden number problem'; higher "a" values are related to the noisy polynomial interpolation problem confirming that these cases are hard to break.

The number of polynomials is selected. The number of polynomials will be referred to as 'm'. A practical choice for m is 2. A more secure application may use a higher value of m, say 3 or 4, or even higher. Note that a low-complexity application may impose a low value of m, since a high value m implies higher implementation complexity at the TTP.

Higher values of security parameters a and m increase the complexity of the system and accordingly increase its intractability. More complicated systems are harder to analyze and thus more resistant to cryptanalysis. The degree a may conveniently be the same for all parameter sets, also m may be the same for all parameter sets; note that this is not necessary.

In an embodiment, a public modulus N is selected satisfying $2^{(a+2)b-1} \leq N$ and most preferably also $N \leq 2^{(a+2)b}-1$. The bounds are not strictly necessary; the system could also use a smaller/larger value of N, although that is not considered the best option.

Often the key length, degree and number of polynomials will be pre-determined, e.g. by a system designer, and provided to the trusted party as inputs. As a practical choice one may take $N=2^{(a+2)b}-1$. For example if $a=1$, $b=64$ then N may be $N=2^{192}-1$. For example if $a=2$, $b=128$ then N may be $N=2^{512}-1$. Choosing for N the upper or lower bound of the above interval has the advantage of easy computation. To increase complexity for an attacker, one may choose a random number within the range for N.

A number of m private moduli $p_1, p_2, \ldots, p_m$, are selected by the trusted third party (TTP). Moduli are positive integers. During the registration steps each device will be associated with an identity number. Each selected private modulus is larger than the largest identity number used. For example, one may bound identity numbers by requiring that they are less or equal to $2^b-1$, and that the selected private moduli are larger than $2^b-1$. Each selected number satisfies the following relationship $p_j = N + \gamma_j \cdot 2^b$. Wherein the $\gamma_j$ are integers such that $|\gamma_j| < 2^b$. One practical way of selecting numbers that satisfy this requirement is to choose a set of m random integers $\gamma_j$ such that $-2^b + 1 \leq \gamma_j \leq 2^b - 1$ and compute the selected private moduli from the relationship $p_j = N + \gamma_j \cdot 2^b$. Having $|\gamma_j|$ a bit larger may be allowed, however, a problem may occur in that the modular operation goes too far so that shared keys might not be equal.

For $m>1$, the system is more complicated, and thus more secure, since modulo operation for different moduli are combined even though such operations are not compatible in the usual mathematical sense. For this reason it is advantageous to choose the selected private moduli as pair wise distinct.

A number of m symmetric bivariate polynomials $f_1, f_2, \ldots, f_m$ of degrees $a_j$ are generated. All degrees satisfy $a_j \leq a$, most preferably $a = \text{MAX}\{a_1, \ldots, a_m\}$. A practical choice is to take each polynomial of degree a. A bivariate polynomial is a polynomial in two variables. A symmetric polynomial f satisfies $f(x,y)=f(y,x)$. Each polynomial $f_j$ is evaluated in the finite ring formed by the integers modulo $p_j$, obtained by computing modulo $p_j$. The integers modulo $p_j$ form a finite ring with $p_j$ elements. In an embodiment the polynomial $f_j$ is represented with coefficients from 0 up to $p_j - 1$. The bivariate polynomials may be selected at random, e.g. by selecting random coefficients within these bounds.

The security of the key sharing depends on these bivariate polynomials as they are the root keying material of the system; so preferably strong measures are taken to protect them, e.g. control procedures, tamper-resistant devices, and the like. Preferably the selected integers $p_1, p_2, \ldots, p_m$ are also kept secret, including the value $\gamma_j$ corresponding to $p_j$, though this is less critical. We will refer to the bivariate polynomials also in the following form: for $j=1, 2, \ldots, m$, we write $f_j(x, y) = \sum_{i=0}^{a} f_{i,j}(x) y^i$.

The above embodiment can be varied in a number of ways. The restrictions on the public and private moduli may be chosen in a variety of ways, such that obfuscation of the univariate polynomial is possible, yet that the shared keys obtained at network devices remain sufficiently close to each other sufficiently often. As explained, what is sufficient will depend on the application, the required security level and the computing resources available at the network devices. The above embodiment combines positive integers such that the modular operations which are carried out when generating the polynomials shares are combined in a non-linear manner when they are added over the integers creating a non-linear structure for the local key material stored on a network device. The above choice for N and $p_j$ has the property that: (i) the size of N is fixed for all network devices and linked to a; (ii) the non-linear effect appears on the most significant bits of the coefficients forming the key material stored on the device. Because of that specific form the shared key may be generated by reducing module $2^b$ after the reduction modulo N.

These design concepts can be applied in a more general way to improve on aspects (i) and (ii) as mentioned in the last paragraph. Below different, general constructions, are given to choose the public and private moduli. To address the first point (i), this structure for N and $p_j$ fits a more general expression where we write $p_j = 2^X + \gamma_j 2^Y - 1$ such that for each j, $Y_j + b\alpha_j = X$ and $|\gamma_j| < 2^b$. This expression allows for a more variable form $p_j$ while ensuring a maximum effect when introducing non-linear effects. Note that one can also make, $Y_j + b\alpha_j \approx X$ where the difference between the left and right-hand side is a fraction of the key length.

To address the second point, the above form for N and $p_j$ fits an even more general expression in which $p_j = \beta_j 2^X + \gamma_j 2^{Y_j} \zeta_j 2^{Z_j}$. By setting, e.g. $\zeta_j = -1$, $\beta = 1$, and $Z_j = 0$ $\forall j$ we obtain the previous expression in which the different $\gamma_j$ values introduce a non-linear effect in the most significant bits of the coefficients of the key material stored on a network device. In this case, the constant public modulus (N) is $N = 2^X - 1$, while the private variable part used in the generation of different positive integers involved in the modular operations is $\gamma_j 2^{Y_j}$. Alternatively, we can set $\gamma_j = 1$, $\beta = 1$, $Z_j = 0$, $Y = (\alpha_j + 1)b$, $X = (\alpha_j + 2)b \forall j$ while $\zeta_j$ are different for different j such that $|\zeta_j| < 2^b$. In this case, the differences in $\zeta_j$ allow introducing a non-linear effect in the least significant bits of the coefficients of the local key material stored on a node. The construction of the public part in this case is also different and equal to $N = \beta_j 2^{X_j} + \gamma_j 2^{Y_j} = 2^X + 2^{b(\alpha_j - 1)}$ i.e., the parts that remain constant. Note in this case the non-linear effect is in the lowest part, and because of the condition for maximum mixing effect mentioned before, then the difference between $Y_j - Z_j - \log_2(\zeta_j)$ must be $\alpha_j b$. In a similar way, other constructions can be defined following the same concept.

As shown above many choices for the parameters are possible. However, some choices will give better implementations. Especially the choice of public modulus is important. For example, some choices for the public modulus allow for efficient modulo operations. Also the effect of the public modulus on the bits from which we take the key, say the LSB, is preferably different. A different effect may be tested by performing the operations for generating the shared key and test if the differences in the $p_i$ lead to a different way of generating the key. This may be observed, in the example below.

For example, it is advantageous to select public moduli that have small differences in the key length number of least significant bits, say less than a predetermined difference. For example, an embodiment may use numbers such as $t=2$, and $N_1 = 2^{(a+2)b} - 1$ and $N_2 = 2^{(a+2)b} - 2 - 1$. In this specific case, the term $-2$ plays an important role during the key generation phase since the reductions module $N_1$ will not include that effect, but the reductions module $N_2$ will include it. Note that the reduction in this case concerns moving overflow bits that are higher than $(\alpha+2)b$ bits to the lowest part.

However, a problem with choosing the public moduli in that way is that only a limited number of options much smaller than $2^b$ are available. In general, we want to introduce a term $2^h$ in N such that $h<b$ and $h>1$. Also the problem is that the number of bits that are actually affected by the different form of the N will be approximately $b-h$ and there will be only around $2^h$ different numbers. To overcome these issues, e.g. having more options for N and maximizing the number of bits that can be used for the key affected by different operations, one could use the a more general definition of the $p_i$ in the manner two paragraphs above. In that case a non-linear effect is introduced in both the MSB and LSB of the polynomial coefficients, e.g. by using $p_i = N - \gamma_i 2^{b(a+1)} - \zeta_i$ with the corresponding public modulus $N = 2^{(a+2)b} - 2^{ba}$. As defined here, the $\gamma_i$ and $\zeta_i$ are chosen different for all $p_i$, preferably also different across all parameter sets. The key in this case is generated from the middle bits, and not from the LSB.

A similar choice, is the following. In these equations the first index i indexes the parameter sets and runs up to t; the second index j indexes the number of numbers p used per parameter set and run up to m.

$$N_i = 2^{(a+2)b} - 2^{ba} - \zeta_i$$

$$p_{i,j} = N_i - \gamma_{i,j} 2^{b(a+1)}$$

A practical choice is to take t=2. Then each parameter set may be chosen. A practical choice is to take m=2 for each parameter set. Especially in the equations immediately above, these are good choices. With this construction one can find many $N_i$ by varying the b-bit $\zeta$ values, say at random. In this construction the $\gamma_{i,j}$ parameters perform mixing in the generation of the keying material shares stored on the devices. This may be done by the trusted party. The $\zeta$ parameters perform mixing of the keys on the device. Most preferably, noise is added in this case as well, following the same motivation as in the embodiment. In this case, the condition for the noise needs to be updated so that the sum of the noise, i.e., obfuscation polynomials, equal zero at the position from which the key is extracted (i.e., from the middle bits)

It is preferred that the public moduli, say $N_1$ and $N_2$, are not all a multiple of $2^b$. This is so because for positive integers a, m, n, and for a suitable integer q, we have that $a = qmn + \langle a \rangle_{mn}$, and so $a \equiv \langle a \rangle_{mn}$ mod n from which we infer that $\langle a \rangle_n = \langle \langle a \rangle_{mn} \rangle_n$. As a consequence, if $N_1$ and $N_2$ both are multiples of $2^b$, then $\langle \langle F_\eta^1(\eta') \rangle_{N_1} + \langle F_\eta^2(\eta') \rangle_{N_2} \rangle_{2^b} = \langle F_\eta^1(\eta') + F_\eta^2(\eta') \rangle_{2^b}$. That is, the problem reduces to the t=1 case.

Registration Steps

In the registration step each network device is assigned keying material (KM). A network device is associated with an identity number. The identity number may be assigned on demand, e.g. by the TTP, or may already be stored in the device, e.g. stored in the device at manufacture, etc.

The TTP generates a set of keying material $KM^A$ for a device with identity number A by calculating t polynomials as follows:

$$F_i^A(X) = \Sigma_{j=1}^m \langle f_j(x,A) \rangle_{p_j} \Sigma_{k=0}^a \epsilon_{i,k}^A X^k = \Sigma_k C_{i,k}^A X^k$$

In the immediately above equation, the index i indexes the parameter sets, i.e. runs from 1 to t. The index j indexes the number of polynomials and private moduli per parameter set. The index k indexes the coefficients in the obfuscating polynomial. Note that one obfuscating polynomial is selected per parameter set. Some or all parameter sets may not have an obfuscating polynomial. Also the public moduli from the parameter set corresponding to the above univariate polynomials are included in the local key material.

X is a formal variable. Note that the keying material is non-linear. The notation $\langle \ldots \rangle_{p_j}$ denotes reducing modulo $p_j$ each coefficient of the polynomial between the brackets. The notation '$\epsilon_{A,i}$' denotes a random integer, which is an example of an obfuscating number, such that $|\epsilon_{i,k}^A| < 2^{(a+2-k)b-2}$. Note that any one of the random integers may be positive or negative. The random numbers E are generated again for each device. The term $\Sigma_{k=0}^a \epsilon_{i,k}^A X^k$ thus represents for each i a polynomial in X of degree a, of which the coefficient length is shorter with increasing degree. Alternatively, a more general, but more complicated condition is that $\Sigma_{k=0}^a |\epsilon_{i,k}^A| \cdot 2^{b+k}$ is small, e.g. <2a.

All other additions may either use the natural integer arithmetic, or (preferably) they use addition modulo $N_i$. So the evaluation of the univariate polynomials $\Sigma_{j=1}^m \langle f_j(x, A) \rangle_{p_j}$ is each individually done modulo a smaller modulus $p_j$ but the summation of these reduced univariate polynomials themselves is preferably done modulo N. Also adding the obfuscating polynomial $\Sigma_{k=0}^a \epsilon_{i,k}^A X^k$ may be done using conventional integer arithmetic or, preferably, modulo N. The keying material comprises the coefficients $C_{i,k}^A$ with k=0, . . . , a, and i=1, . . . , t. The keying material may be presented as a set of polynomials as above. In practice, the keying material may be stored as a list, e.g. a two-dimensional array, of the integers $C_{i,k}^A$. The device A also receives the numbers $N_i$ and b. Manipulation of polynomials may be implemented, e.g. as manipulation of arrays containing the coefficients, e.g. listing all coefficient in a predetermined order. Note that polynomials may be implemented, in other data structures, e.g. as an associative array (aka a 'map') comprising a collection of (degree, coefficient) pairs, preferably such that each coefficient appears at most once in the collection. The coefficients $C_i^A$ that are provided to the device are preferably in the range 0, 1, . . . N−1. Due to a small identifier size it may happen that not all bits of the coefficients will be used for key generation. In that case, only the relevant coefficient parts need to be stored.

As indicated at the beginning of this document, to reduce the likelihood of device A deriving a different shared key than his counterpart device B, the obfuscating polynomials may be selected such that for each k=0, . . . , a $$\Sigma_{i=1}^t \epsilon_{i,k} \equiv 0 \bmod 2^b$$

That is the sum of all obfuscating polynomials is a multiple of $2^b$. As already mentioned, this has the nice property that if the attacker wants to remove the noise by adding the keying materials, then he is mixing keying materials obtained by performing modular operations with different moduli. If he does not add them, then the keying materials are hidden by the noise.

In case, that the more general construction for N and the integer numbers $p_j$ is used, the obfuscating polynomial needs to be adapted so that the random numbers E affect different parts of the coefficients. For instance, if the non-linear effect is introduced in the least significant bits of the coefficients of the key material stored on the network devices, then the random numbers should only affect the highest part of the coefficients and a variable number of bits in the lowest part of the coefficients. This is a direct extension of the method described above and other extensions are feasible.

Use Phase

Once two devices A and B have an identity number and received their keying material from the TTP, they may use their keying material to obtain a shared key. Device A may perform the following steps to obtain his shared key. First, device A obtains the identity number B of device B, then A generates the shared key by computing the following:

$$K_{AB} = \langle \Sigma_i \langle F_i^A(X)|_{X=B} \rangle_{N_i} \rangle_{2^b} = \langle \Sigma_i \Sigma_k C_{i,k}^A B^k \rangle_{N_i} \rangle_{2^b}$$

That is, A evaluates each of his univariate polynomials $F_i^A$ from his keying material, for the value B; the result of evaluating the keying material is an integer. Next device A reduces the result of the evaluation first modulo the corresponding public modulus $N_i$. Next the result of the evaluation of all polynomials $F_i^A$ after modular evaluation are added as integers, and then the result of this summation is taken modulo the key modulus $2^b$. The result will be referred to as A's shared key, it is an integer in the range of 0 up to $2^b-1$. For its part, device B can generate B' shared key by evaluating its keyed material for identity A and reducing the result modulo N and then modulo $2^b$, in the same manner as A did.

In line with the above description, if a more general expression of N and the positive integers $p_j$ are used, then the method to obtain the b-bits key needs a small adaptation. In particular, we can take $p_{i*m+j}=\beta 2^X+\gamma_{i*m+j}2^{Y_{i,j}}+\beta 2^W+\zeta_i 2^{Z_i}$ for the private moduli and $N_i=\beta 2^X+\delta 2^W+\zeta_i 2^{Z_i}$ for the public modulus, then this allows introducing a non-linear in the keying material shares by means of the b-bits term $\gamma_{i*m+j}$. Note that in this specific construction, we have m polynomials in each keying material set and each of those polynomials is indexed by identifier j. Furthermore we can have up to t different keying material sets indexed by means of i. Note also that typically $Y_{i,j}$ is constant $\forall i,j$. Further the b-bits terms $\zeta_i$ differ for different $N_i$ with i=1, . . . , t and are the ones that introduce the non-linear effect when mixing the keys generated from different keying materials on the node. In this case, the key is generated as follows:

$$K_{AB} = \left\langle \frac{\Sigma_i \langle F_i^A(X)|_{X=B}\rangle N_i}{2^W} \right\rangle 2^b$$

As we can see, each of the t keying material shares are evaluated in x=B and reduced modulus $N_i$. In this reduction the effect of $\zeta_i$ is introduced. Since the smallest power of two common to all $p_{i*m+j}$ is w, then the result is divided (integer division) by $2^w$ so that a common key can be generated.

Because the bivariate polynomials in the root key material are symmetric A's shared key and B's shared key are often, though not necessarily always, equal. The particular requirements on the private moduli, integers $p_1, p_2, \ldots, p_m$, in the parameter sets and on the random numbers E are such that the keys are often equal and almost always close to each other modulo two to the power the key length. If A and B have obtained the same shared key, then they may use it as a symmetric key which is shared between A and B; for example, it may be used for a variety of cryptographic applications, for example, they may exchange one or more messages encrypted and/or or authenticated using the shared key. Preferably, a key derivation algorithm is applied to the shared key for further protection of the master key, e.g. a hash function may be applied.

If A and B have not obtained the same shared key, then it is almost certain that these keys are close to each other, by removing a number of the least significant bits of the keys, the generated keys can almost always be made the same. A and B may verify if their shared keys are equal by performing a key confirmation, for example, A may send to B a message containing the pair (m, E(m)), wherein m is a message, say a fixed string or a random number, and E(m) is the encryption using A's shared key.

By decrypting E(m) using B's shared key, B may verify if the keys are equal. If so, B may respond to A by informing him of the situation.

If the keys are not equal, A and B may engage in a key equalization protocol. For example, they may make use of the fact that the two keys are arithmetically close to each other. For example, network device A and B may iteratively remove a least significant bit and send a key confirmation message until the keys are equal. After obtaining equal keys, A and B may perform a key derivation algorithm to regain keys of a usual key length.

The selected m private moduli, $p_1, p_2, \ldots, p_m$, are preferably pair wise relatively prime. If these numbers are pair wise relatively prime the lack of compatibility between the modulo operations is increased. Obtaining pair wise relatively prime numbers may be obtained by selecting the integers in order, testing for each new integer if all pairs of different numbers are still relatively prime, if not the just selected number is removed from the set. This procedure continues until all m numbers are selected.

The complexity increases even further by requiring that the selected m private moduli, $p_1, p_2, \ldots, p_m$ are distinct prime numbers. In that case each prime number may be required to have the form $p_j=N+\gamma_j\cdot 2^b$. Wherein the $\gamma_i$ are integers such that $|\gamma_j|<2^b$. Experiments have confirmed that these primes are easily available. For example, one may repeatedly select a random $\gamma_i$ and test the resulting $p_j$ until a prime is found. The same applies if a more general expression, as described above, is applied. Indeed it follows from the prime number theorem for arithmetic progressions that as long as a is of about the same order of magnitude as b, in particular for a<b, such primes are abundant. In particular, for any combination of key length in the group 64, 128, 196, 256 and degree in the group 2, 3, we confirmed by experiment that many prime numbers of this form could be generated using the above algorithm within practical time limits. When using prime numbers each polynomial $f_j$ is thus taken in the finite field with $p_j$ elements.

Many variants are possible to choose the various parameters used during the registration and use phase. For example, in a simplified embodiment, the private moduli are smaller than the public modulus and satisfy the relationship $p_j=N-\beta_j\cdot 2^b$. Wherein the $\beta_j$ are positive integers such that $\beta_j<2^b$. One practical way of selecting numbers that satisfy this requirement is to choose a set of m random positive integers $\beta_j$ such that $\beta_j<2^b$ and compute the selected private moduli from the relationship $p_j=N-\beta_j\cdot 2^b$. As noted, the difference between $Y_i-Z_1-\log_2(\zeta_i)$ may be $\alpha_i b$. In a similar way, other constructions can be defined following the same concept. In particular, we can write $p_j=\beta 2^X+\gamma_j 2^{Y_j}+\delta 2^W+\zeta_j 2^{Z_j}$ for the private moduli and $N=\beta 2^X+\delta 2^W$ for the public modulus. A particular instantiation of this construction is $p_j=2^{2(a+1)b}+\gamma_j 2^{(a+1)b}+2^{ab}+\zeta_j$ and $N=2^{2(a+1)b}+2^{ab}$. In this case, the absolute value of terms $\gamma_j$ and $\beta_j$ is smaller than $2^b$ and are in charge of creating a non-linear effect on the MSB and LSB of the coefficients of the local stored key material on a device. Note that since the device identifiers are around b-bits long, $\gamma_j(\beta_j)$ affects the MSB (LSB) of the coefficients of the polynomial share evaluated in the ring of integers modulo $p_j$. Afterwards during the generation of the local key material for a device the coefficients of the polynomial shares in different rings are added over the integers so that the origin of the contributions is concealed.

The key may be generated as follows:

$$K_{AB} = \left\langle \frac{\Sigma_i \langle F_i^A(X)|_{X=B}\rangle N_i}{2^W} \right\rangle 2^b,$$

but if the even more general expression of $p_j$ and N is used that allows introducing a non-linear effect on both MSB and LSB, then the division after the reduction modulo N is by 2 to the power of W, where $2^W$ is the highest integer power of 2 of which N is an integer multiple. Other constructions of N and $p_j$ may require a division by another power of two. Because the bivariate polynomials in the root key material are symmetric A's shared key and B's shared key are often, though not necessarily always, equal.

FIG. 1 is a schematic block diagram illustrating a root key material generator 100. A key material obtainer is configured to provide input data, except an identity number, needed by a local key material generator for generating local key material. A key generator is an example of a key material obtainer. Instead of generating all or part of the input data, some parameters can also be obtained by the root key material generator by receiving them; for example the key obtainer may comprise an electronic receiver for receiving input data, e.g. a public and private modulus. A key material obtainer obtains all the needed parameters except the identity numbers from an external source. In an embodiment a, b, m are predetermined, e.g. received and the public modulus and the private moduli in the parameter sets and corresponding (symmetric) bivariate polynomials are generated. In an embodiment also the public moduli are pre-determined, e.g. received.

Root key generator 100 generates multiple parameter sets and comprises a number t of parameter sets element 130 which contains the number of parameter sets that need to be generated. For example, t=2 or t=3, etc.

Root key generator 100 comprises a polynomial degree element 112, a key length element 114 and a number of polynomials element 116 configured to provide the polynomial degree, the key length and the number of polynomials, i.e., a, b and m respectively, for a given parameter set. Typically, a key length element 114 will be the same over all parameter sets. Typically a polynomial degree element 112, will also be the same over all parameter sets, although this is not necessary. In some embodiments the number of polynomials element 116 is varied across parameter sets; for example some may use m=1, while some may use m=2. Having m constant, say m=1 or m=2, across all sets is also possible.

Although these elements may be generated, e.g. depending on circumstances, typically these parameters are chosen by a system designer. For example, the elements may be designed as non-volatile memories, or as receivers for receiving the element values, or as volatile memories connected to a receiver, etc. A suitable choice include t=2, a=2, b=128, m=2. Any one of the numbers may be increased or decreased to obtain a more or less secure system.

Root key generator 100 comprises a public modulus element 110 configured to provide the public modulus N of a parameter set. The public modulus may or may not be chosen by a system designer. For example, the public modulus may be set a convenient number allowing fast reduction (close or equal to a power two). The public modulus is chosen within a range determined by the elements 112 and 114.

Root key generator 100 comprises a private modulus manager 122 configured to provide the private modulus p, or multiple private moduli $p_j, \ldots, p_m$. For example, they are chosen at random within the appropriate bounds.

Root key generator 100 comprises a symmetric bivariate polynomial manager 124 configured to provide the symmetric bivariate polynomial f, or multiple symmetric bivariate polynomial $f_1, \ldots, f_m$. Each symmetric bivariate polynomial is chosen with coefficients random modulo the corresponding private modulus, i.e. the private modulus having the same index. The coefficients may be chosen within the range 0 to p−1, and may be chosen at random.

The private moduli may be chosen by adding or subtracting a multiple of two to the power of the key length to the public modulus. This will result in private moduli such that the difference with the public modulus ends in a series of consecutive zeros. One may also choose a public modulus and one or more private moduli such that a series of key length consecutive zeros occurs not at the end but another position, say position 's', counting from the least significant bit.

FIG. 1' shows an example of root key material 180 generated by root key generator 100. Root key material 180 comprises a number of parameter sets 140, in this case it has the value 3. Root key material 180 comprises three parameter sets. The first set comprises public modulus 141, private moduli 151, 153 and 155 and corresponding bivariate polynomials 152, 154 and 156. The second set comprises public modulus 142, private moduli 161, and 163 and corresponding bivariate polynomials 162, and 164. The third set comprises public modulus 143, private moduli 171, 173 and 175 and corresponding bivariate polynomials 172, 174 and 176. In this case the degree of the polynomials is implicit in the representation of the polynomials, it could be made explicit as well. In this example of root key material 180 the key length 144 is also recorded.

During operation, root key material obtainer 100 repeatedly generates parameter sets until a number of sets has been produced equal to the number in element 130. The number of parameter sets may be recorded in root key material 180 at 140.

FIG. 2 is a schematic block diagram illustrating a local key material generator 200. Key material generator 100 and local key material generator 200 together form a system for configuring a network device for key sharing.

Local key material generator 200 comprises a polynomial manipulation device 240. Local key material generator 200 comprises a root key material element 210 for providing the root key material to the polynomial manipulation device 240, i.e., providing multiple parameter sets to polynomial manipulation device 240, in turn so as to produce multiple univariate polynomials. Element 210 may be implemented by the corresponding elements of key material generator 100; these elements may also be memories or busses to connect to key material generator 100.

Local key material generator 200 comprises an obfuscating number generator 260 for providing an obfuscating numbers '$\epsilon_{A,i}$' to the polynomial manipulation device 240. The obfuscated number may be a random number, e.g. generated with the random number generator. The obfuscating number generator 260 may generate multiple obfuscating numbers for multiple coefficients of the univariate polynomial. Generator 260 may be restricted to generating single numbers, say one obfuscating number per parameter set, or one obfuscating number for at least two of the parameter sets, but generator 260 may also be configured to generate non-zero obfuscating polynomials, which are to be added to the to the univariate polynomial which is corresponding to the current parameter set to obtain an obfuscated univariate polynomial. In an embodiment an obfuscating number is determined for each coefficient of the univariate polynomial. An obfuscating polynomial may have 1, or 2 or more non-zero coefficients.

Local key material generator 200 comprises a network device manager 250 configured to receive an identity number for which local key material must be generated, e.g. from a network device, and is configured to send the local key material to the network device corresponding to the identity number. Instead of receiving an identity number, it may also be generated, e.g. as a random, serial or nonce number. In the latter case the identity number is sent along with the local key material to the network device.

The polynomial manipulation device 240 generates a univariate polynomial for each parameter set in root key material element 210.

For each parameter set, polynomial manipulation device 240 obtains, possibly multiple, univariate polynomials by substituting the identity number from manager 250 into each one of the bivariate polynomials and reducing each modulo the corresponding private modulus. The resulting multiple reduced univariate polynomials are added, coefficient wise, with natural arithmetic addition. Also added are the one or more obfuscating numbers. Preferably, the result is reduced, again coefficient wise, modulo the public modulus; the coefficients of the latter may be represented in the range 0 to N−1.

The obfuscated univariate polynomials are part of the local key material corresponding to the identity number. If needed, the public moduli, degree and the key length are also sent to the network device.

FIG. 2' shows local root key material 280 generated for a network device from a root key material 180. local root key material 280 comprises the number of parameter sets 140 (here 3), the key length 144, public moduli 141, 142 and 143 and corresponding generated (possibly obfuscated) univariate polynomials 252, 262 and 274 respectively. Optionally, local root key material 280 may comprise a power of 2 for division and key modulus for generating the shared key.

Figure 3:
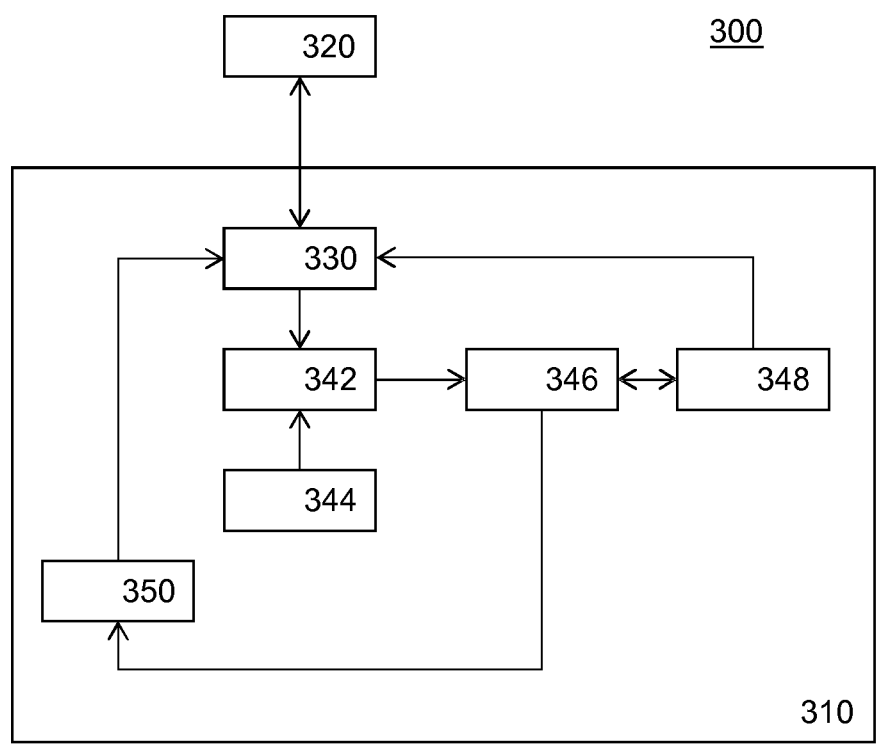
FIG. 3 is a schematic block diagram illustrating a communication network.

FIG. 3 is a schematic block diagram illustrating a communication network 300 comprising multiple network devices; shown are a first network device 310 and a second network device 320. We will illustrate first network device 310. Second network device 320 may be the same, or work along same principles.

Network device 310 comprises a transceiver 330 combining a sender and a receiver for sending and receiving messages in electronic, e.g. digital, format, in wired or wireless from and to second network device 320. Possibly, transceiver 330 is also used to receive the local key material from the network authority 200. Through the transceiver 330 the identity number of another network device is received; in the figure of the second network device 320.

Network device 310 comprises a local key material obtainer 344. The local key material obtainer 344 may be implemented as local memory, e.g. non-volatile memory such as flash memory for storing the local key material. The local key material obtainer 344 may also be configured to obtain the local key material from generator 200, e.g. via transceiver 330. Local key material obtainer 344 is configured to provide the polynomial manipulation device with the needed parameters.

Network device 310 comprises a polynomial manipulation device 342. The polynomial manipulation device 342 performs in two phases.

In the substitution phase, the identity number of the second network device is substituted (530) into each of the univariate polynomials in the local key material. The result of the result of the substituting is reduced modulo the public modulus corresponding to said univariate polynomial. In the subsequent adding phase, the results of the reductions modulo a public modulus are added together and reduced (540) modulo a key modulus. Note that for some combinations of N and private modulus, a division by a 2 power is required before the result is reduced modulo a key modulus.

Network device 310 comprises a key derivation device 346 for deriving the shared key from the result of the reduction modulo the key modulus. For example, key derivation device 346 may remove one or more least significant bits. Key derivation device 346 may also apply a key derivation function. It is also possible to use the result of the second reduction without further processing.

Network device 310 comprises an optional key equalizer 348. Note that it may happen that the shared key derived in the first network device is not equal to the key derived in the second network device (based on the identity number of the first network device). If this is considered undesirable, a key equalization protocol may be followed.

Network device 310 comprises a cryptographic element 350 configured to use the shared key for a cryptographic application. For example, cryptographic element 350 may encrypt or authenticate a message of the first network device with the shared key before sending it to the second network device, say a status message. For example, cryptographic element 350 may decrypt or verify the authenticity of a message received from the second network device.

Typically, a system for configuring a network device for key sharing 200, and a first network device configured to determine a shared key 310, each comprise a microprocessor (not shown) which executes appropriate software stored at the respective devices, e.g. which software may have been downloaded and stored in a corresponding memory, e.g. RAM (not shown).

An interesting embodiment is obtained for a=1, especially in combination with higher values of m, say higher than 1, 2 or higher, 4 or higher. The required polynomial manipulation reduces to a single multiplication and reduction, giving an especially simple implementation. However, even for this simple case recovering the original bivariate polynomials is not straightforward, and becomes increasingly complicated with higher values of m. Although no viable attack is known even for a=1, the linear structure may be a starting point for future analysis, so one may want to restrict to a>1, for this reason.

Figure 4:
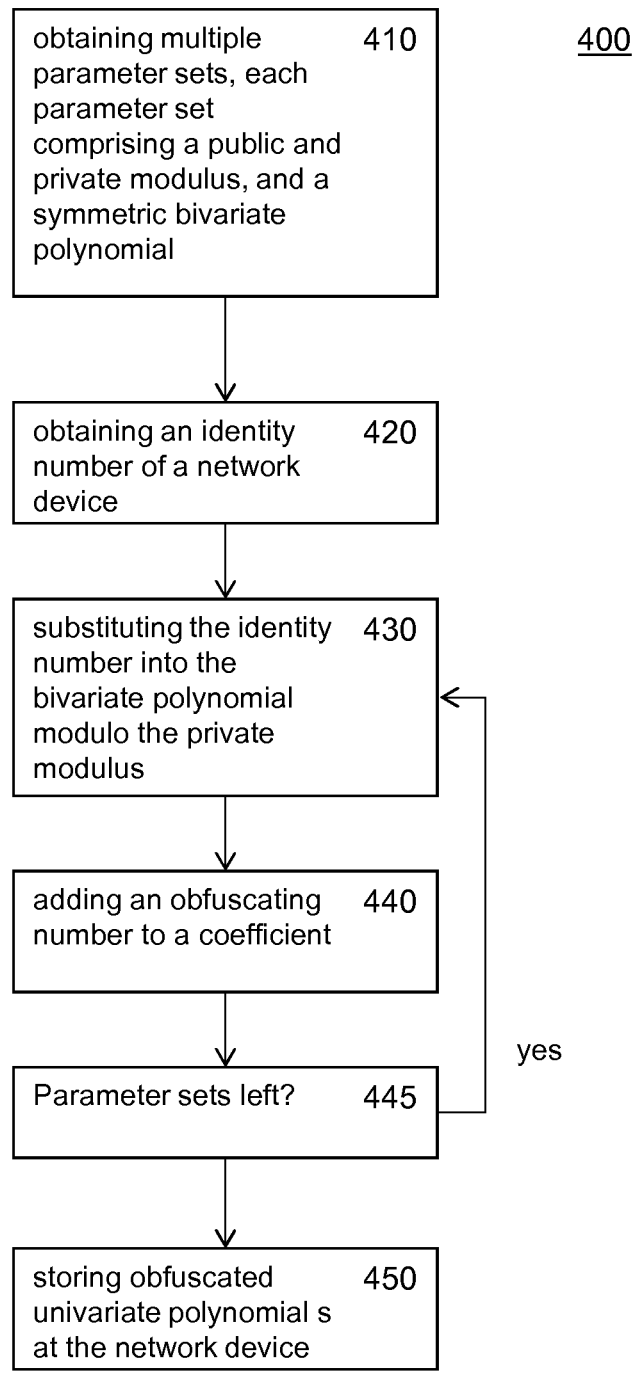
FIG. 4 is a schematic flow chart illustrating generating local key material.

FIG. 4 is a schematic flow chart illustrating a method 400 of generating local key material. Method 400 may be used by a trusted third party. In step 410, the required parameters are obtained. In particular, multiple parameter set, at least two, are obtained. Each parameter set contains public moduli and at least one private modules and at least one bivariate polynomial. In step 420, an identity number of a network device is obtained, e.g. over a telecommunication network. The identity number may be received in an electronic message.

Step 430 is repeated once for each parameter set. The obtained identity number is substituted into the bivariate polynomial, and reduced modulo the private modulus. There may be more, say 2, bivariate polynomials. In that case the substitution is made into each one, and the results are added in integer arithmetic. In step 440, the result is obfuscated, for example by adding an obfuscating polynomial. In a simple implementation the obfuscation may be only a single coefficient. Step 440 is optional. In this way, or as described herein, a univariate polynomial and public modulus combination is obtained which will form part of the local key material. In step 450, it is decided if there are parameter sets left and if so steps 430 and 440 are repeated for a next parameter set. In step 450, the local key material including the obfuscated univariate polynomials are stored at the network device.

Figure 5:
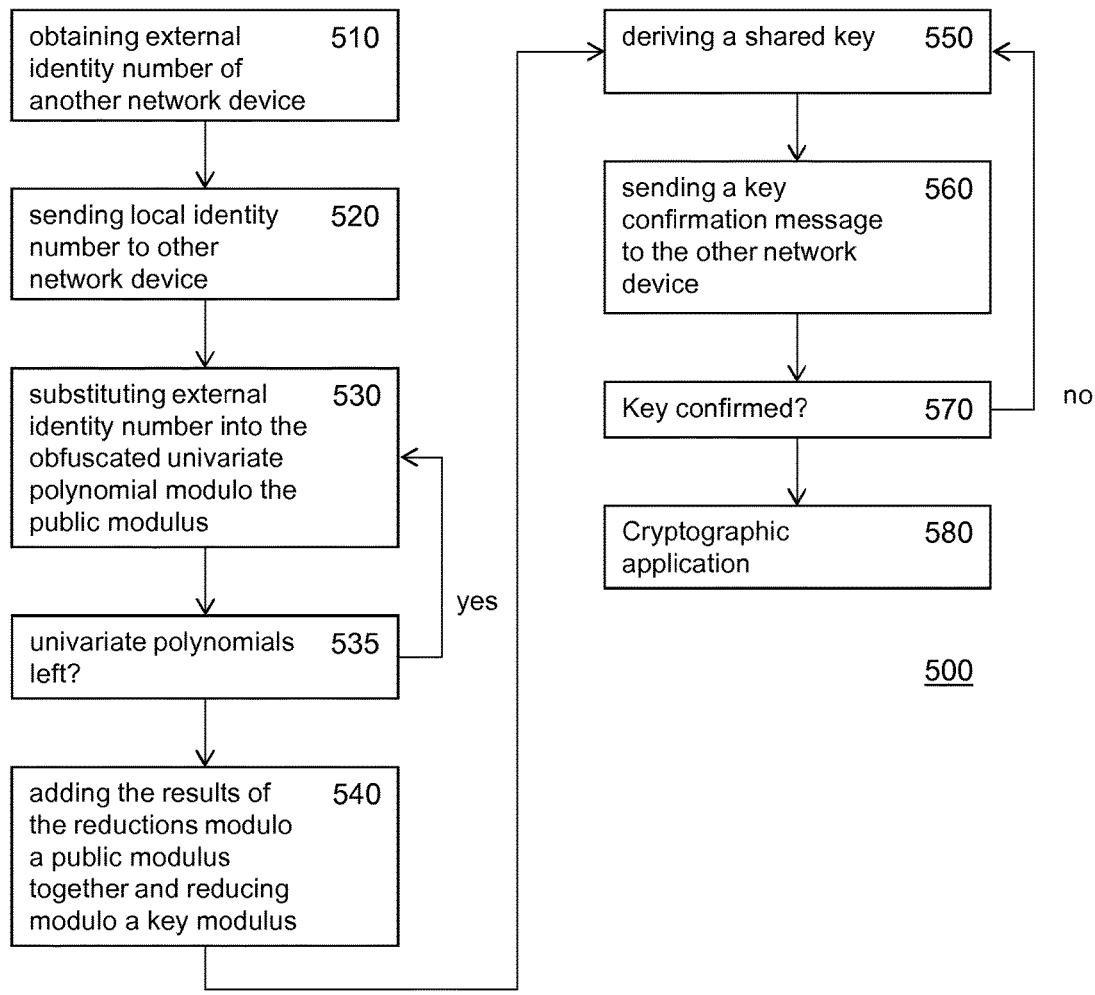
FIG. 5 is a schematic flow chart illustrating generating a shared key.

FIG. 5 is a schematic flow chart illustrating a method 500 of generating a shared key. Method 500 may be executed by a network device.

In step 510, the external identity number of another network device is obtained, e.g. by receiving an electronic message. In step 520, the local identity number is sent to the other network device. After steps 510 and 520, the local network device and the external network device have each other's identity number. Using their local key material they proceed to derive common shared key.

The local network device repeats a substitution step 530 for univariate polynomial in his local key material. In step 530, the external identity number is substituted into a obfuscated univariate polynomial modulo the corresponding public modulus. In step 535 it is decided if there are univariate polynomials left, and if so step 530 is repeated for a next univariate polynomials of the local key material. In step 540, the results of the reductions modulo a public modulus are added together and reduced modulo a key modulus.

The result of step 550 is the start of obtaining the shared key. In step 550, a shared key is derived, say by applying a key derivation algorithm. In step 560, a key confirmation message is sent to the other network device, and in step 570, it is determined if the key is confirmed. If the key is not confirmed in step 570, then the method continues in step 550 with deriving a new key. For example, step 550 may remove one additional least significant bit each time the key is not confirmed. If the key is confirmed it can be used in optional cryptographic application, or stored locally for later use.

Steps 550, 560, and 570 together form a key equalization protocol. For example, in step 560, a nonce and encryption of the nonce under the shared key derived in step 550 may be sent to the second device. In step 560, a message is received from the second device. The received message may simply say that the received key confirmation message showed that the keys are not equal. The received message may also contain a key confirmation message. In the latter case, the first network device verifies the key confirmation message and establishes if the keys are equal. If not a new key is derived, for example, by deleting a least significant bit.

Figure 6:
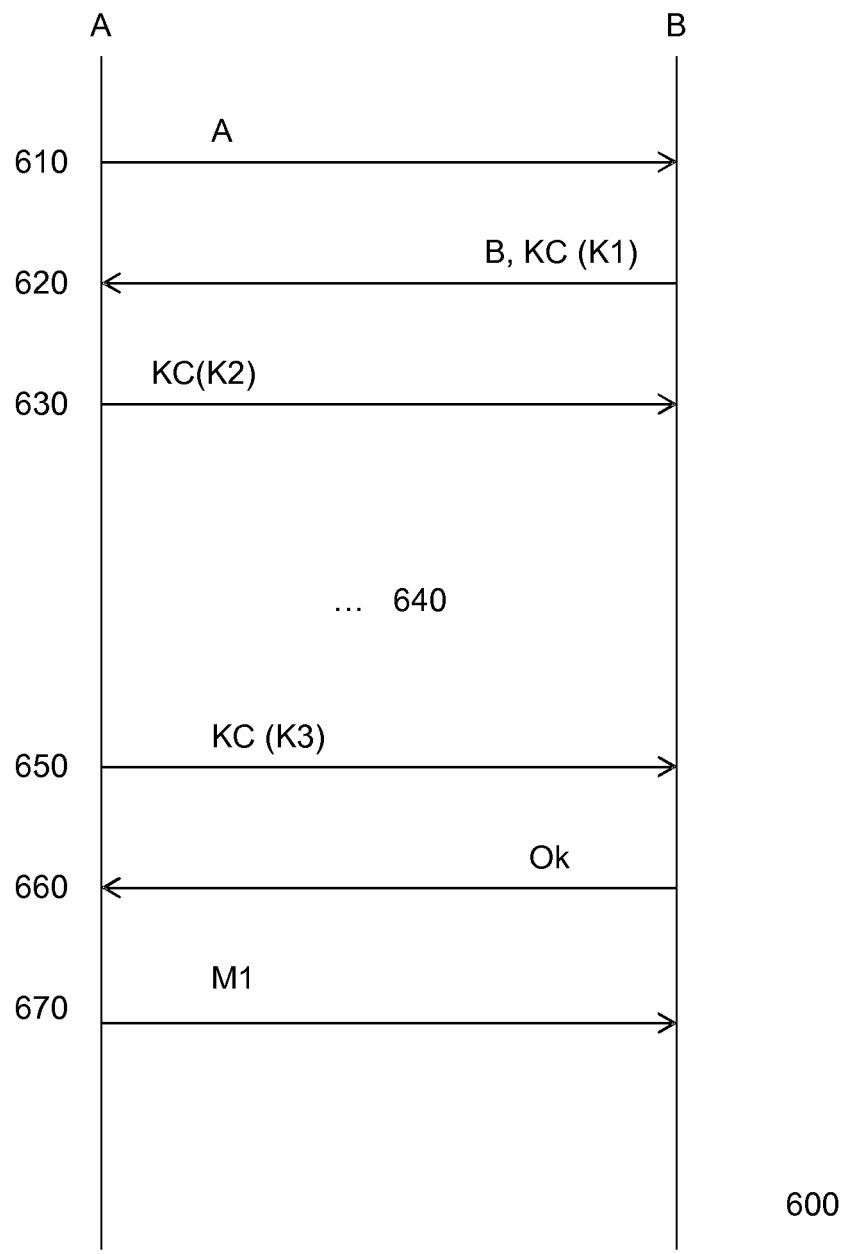
FIG. 6 is a schematic sequence diagram illustrating generating a shared key.

FIG. 6 shows in schematic form a possible sequence of message between two network devices, device A and B, while they are generating a shared key. Time runs downward. In step 610, network device A sends his identity number to device B. In step 620, device B sends his identity number and a key confirmation message for the shared key (K1) it derived based on identity number A and his local key material. In step 630, device A found that they did not generate the same key. Device A has deleted one least significant bit (say integer divide by 2) to obtain key K2. In step 630, device A sends a new key confirmation message. In this fashion A and B exchange key confirmation messages 640 until they arrive at the same key in step 650. In step 650, device A sends a key confirmation message to device B. Device B was able to verify that they had arrived at the same key. In step 660, it sends a confirmation thereof, this may be an authenticated message or a key confirmation message, etc. In step 670, device A sends a message M1 which is encrypted (say using AES) and/or authenticated (say using HMAC) using the now equal shared key.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

| List of Reference Numerals for FIGS. 1-3: | |
| --- | --- |
| 100 | a root key material obtainer |
| 110 | a public modulus manager |
| 112 | a polynomial degree element |
| 114 | a key length element |
| 116 | a number of polynomials element |
| 122 | a private modulus manager |
| 124 | a symmetric bivariate polynomial manager |
| 130, 140 | a bivariate polynomial |
| 180 | root key material |
| 200 | a local key material generator |
| 210 | a root key material element |
| 240 | a polynomial manipulation device |
| 250 | a network device manager |
| 252, 262, 272 | a univariate polynomial |
| 260 | an obfuscating number generator |
| 300 | a communication network |
| 310 | a first network device |
| 320 | a second network device |
| 330 | a transceiver |
| 342 | a polynomial manipulation device |
| 344 | a local key material obtainer |
| 346 | a key derivation device |
| 348 | a key equalizer |
| 350 | a cryptographic element |

The invention claimed is:

1. A method of configuring a network device for key sharing that is performed external to the network device, the method comprising:
   obtaining in electronic form, as initialization information, at least two parameter sets, each parameter set comprising a private modulus, a public modulus, and a bivariate polynomial having integer coefficients, the binary representation of the public modulus and the binary representation of the private modulus being the same in at least key length consecutive bits,
   generating, using the initialization information, local key material for the network device, by at least
      obtaining in electronic form an identity number for the network device, and for each parameter set of the initialization information
obtaining a corresponding univariate polynomial, by determining, using a polynomial manipulation device, a univariate polynomial from the bivariate polynomial of the parameter set by substituting the identity number into said bivariate polynomial, and reducing the result of the substitution modulo the private modulus of the parameter set, and supplying the generated local key material for electronic storage at the network device, the generated local key material comprising the public modulus of said each parameter set and the corresponding univariate polynomial of said each parameter set.

2. The method as claimed in claim 1, wherein generating local key material for the network device comprises
for at least two of the at least two parameter sets
generating a non-zero obfuscating polynomial corresponding to said parameter set,
adding, using the polynomial manipulation device, the non-zero obfuscating polynomial to the univariate polynomial which are corresponding to said parameter set to obtain an obfuscated univariate polynomial,
the generated local key material comprising the obfuscated univariate polynomial.

3. The method as claimed in claim 2, wherein each coefficient of the sum of the obfuscating polynomials is a multiple of 2 to the power of the key length.

4. The method as claimed in claim 2, wherein each coefficient of the sum of the obfuscating polynomials divided by a power of two, rounded downwards to an integer number, is a multiple of 2 to the power of the key length.

5. The method as claimed in claim 1, wherein all bivariate polynomials in all parameter sets are symmetric polynomials.

6. The method as claimed in claim 1, wherein in all parameters sets, the same at least key length consecutive bits of the binary representation of the public modulus of a respective parameter set are the same as the least significant key length bits of the private modulus of the respective parameter set.

7. The method as claimed in claim 6, wherein the at least key length consecutive bits are the least significant key length bits.

8. The method as claimed in claim 1, comprising
generating the private modulus using an electronic random number generator, or
generating the bivariate polynomial using an electronic random number generator by generating one or more random coefficients for the bivariate polynomial.

9. The method as claimed in claim 1, wherein one or all public moduli satisfy $2^{(a+2)b-1} \leq N$, wherein N represents the public modulus, $\alpha$ represents the degree of the bivariate polynomial and b represents the key length.

10. The method as claimed in claim 1, wherein at least two parameter sets comprises multiple private moduli, and multiple bivariate polynomials having coefficients modulo, such that there is a set of key length consecutive positions in which the binary representation of the public modulus agrees with the binary representation of all private moduli, the method further comprising
determining the univariate polynomial comprises substituting the identity number into each one of the multiple bivariate polynomials, reducing modulo a private modulus of the multiple private moduli corresponding to the one symmetric bivariate polynomial, and adding the multiple results of the multiple reductions.

11. The method as claimed in claim 1, wherein the obfuscating number is generated such that $|\epsilon_{i,k}^{A}|<2^{(a+2-k)b-2}$, wherein $\epsilon_{A,i}$ denotes the obfuscating number, i denotes the degree of the monomial corresponding to the coefficient, a represents the degree of the bivariate polynomial and b represents the key length.

12. A method for a first network device to determine a shared key, the key being a cryptographic key, the method comprising:
obtaining local key material for the first network device in electronic form, the local key material comprising at least two univariate polynomials and corresponding public moduli,
obtaining an identity number for a second network device, the second network device being different from the first network device,
for each one of the at least two univariate polynomials substituting the identity number of the second network device into said univariate polynomial, and reducing the result of the substituting modulo the public modulus corresponding to said univariate polynomial,
adding the results of the reductions modulo a public modulus together and reducing modulo a key modulus, and
deriving the shared key from the result of the reduction modulo the key modulus.

13. The method as claimed in claim 12, comprising
determining if the first network device and the second network device have derived the same shared key, and if not, deriving a further shared key from the result of the reduction modulo the key modulus.

14. The method as claimed in claim 12, comprising dividing the result of the substituting modulo the public modulus by a zero bit string divisor which is a power of two, the zero bit string divisor being larger than 1, and rounding downwards the result of dividing to an integer number.

15. A network device configured to determine a shared key, the key being a cryptographic key, the network device comprising:
a local key material obtainer configured to obtain local key material for the network device in electronic form, the local key material comprising at least two univariate polynomials and corresponding public moduli,
a receiver configured to obtain an identity number for a different further network device,
a polynomial manipulation device configured to, for each one of the at least two univariate polynomials, substitute the identity number of the second network device into said univariate polynomial, reduce the result of the substituting modulo the public modulus corresponding to said univariate polynomial, and add the results of the reductions modulo a public modulus together and reducing modulo a key modulus, and
a key derivation device configured to derive the shared key from the result of the reduction modulo the key modulus.

16. A system for configuring a network device for key sharing, the system comprising:
a key material obtainer for obtaining in electronic form at least two parameter sets, a parameter set comprising a private modulus, a public modulus, and a bivariate polynomial having integer coefficients, the binary representation of the public modulus and the binary representation of the private modulus are the same in at least key length consecutive bits,
a generator for generating local key material for the network device, the generator comprising a network device manager for obtaining in electronic form an identity number for the network device and for electronically storing the generated local key material at the network device, and a polynomial manipulation device configured for obtaining, for each parameter set, a corresponding univariate polynomial, by determining a univariate polynomial from the bivariate polynomial of the parameter set by substituting the identity number into said bivariate polynomial, and reducing the result of the substitution modulo the private modulus of the parameter set.

17. A non-transitory computer readable storage medium containing a program comprising instructions for causing a processor to carry out a method of configuring a network device for key sharing, the processor being external to the network device, the method comprising:

obtaining in electronic form, as initialization information, at least two parameter sets, each parameter set comprising a private modulus, a public modulus, and a bivariate polynomial having integer coefficients, the binary representation of the public modulus and the binary representation of the private modulus being the same in at least key length consecutive bits, generating, as initialization information, local key material for the network device, comprising
obtaining in electronic form an identity number for the network device, and
for each parameter set of the initialization information obtaining a corresponding univariate polynomial, by determining, using a polynomial manipulation device, a univariate polynomial from the bivariate polynomial of the parameter set by substituting the identity number into said bivariate polynomial, and reducing the result of the substitution modulo the private modulus of the parameter set, and supplying the generated local key material for electronic storage at the network device, the generated local key material comprising the public modulus of said each parameter set and the corresponding univariate polynomial of said each parameter set.

* * * * *